United States Patent
Comte et al.

(10) Patent No.: US 8,753,991 B2
(45) Date of Patent: Jun. 17, 2014

(54) BETA-QUARTZ GLASS CERAMICS AND RELATED PRECURSOR GLASSES

(75) Inventors: Marie Jacqueline Monique Comte, Fontenay aux Roses (FR); Isabelle Marie Melscoët-Chauvel, Chalette-sur-Loing (FR); Delavand Ovono Ovono, Chalette-sur-Loing (FR); Philippe Pradeau, Avon (FR)

(73) Assignee: Eurokera, Chateau-Thierry (FR)

( * ) Notice: Subject to any disclaimer, the term of this patent is extended or adjusted under 35 U.S.C. 154(b) by 40 days.

(21) Appl. No.: 13/521,803

(22) PCT Filed: Jan. 21, 2011

(86) PCT No.: PCT/EP2011/050830
§ 371 (c)(1),
(2), (4) Date: Sep. 25, 2012

(87) PCT Pub. No.: WO2011/089220
PCT Pub. Date: Jul. 28, 2011

(65) Prior Publication Data
US 2013/0178353 A1 Jul. 11, 2013

(30) Foreign Application Priority Data
Jan. 22, 2010 (FR) ...................................... 10 50413

(51) Int. Cl.
*C03C 10/12* (2006.01)
*C03C 10/14* (2006.01)

(52) U.S. Cl.
USPC .................................................. 501/4; 501/7

(58) Field of Classification Search
USPC ............................................ 501/4, 7; 65/33.8
See application file for complete search history.

(56) References Cited

U.S. PATENT DOCUMENTS

| | | | | |
|---|---|---|---|---|
| 6,821,628 B2 * | 11/2004 | Schultheis et al. | ............ | 428/426 |
| 7,456,121 B2 * | 11/2008 | Comte | ................ | 501/4 |
| 7,473,660 B2 * | 1/2009 | Comte | ................ | 501/4 |
| 8,127,571 B2 * | 3/2012 | Martin et al. | ................ | 65/134.1 |
| 8,198,201 B2 * | 6/2012 | Comte et al. | ...................... | 501/4 |
| 2007/0129231 A1 * | 6/2007 | Comte | ................ | 501/4 |
| 2010/0304948 A1 * | 12/2010 | Comte et al. | .................... | 501/32 |

* cited by examiner

*Primary Examiner* — Karl Group
(74) *Attorney, Agent, or Firm* — Michael W. Russell

(57) ABSTRACT

β-quartz glass-ceramics, the composition of which is most particularly optimized, with reference to the refining of their precursor glasses, with reference to good resistance to devitrification of said precursor glasses and with reference to their resistance to temperature ageing, articles comprising such glass-ceramics, lithium alumino-silicate glasses, which are precursors of such glass-ceramics, as well as methods for preparing such glass-ceramics and articles.

10 Claims, 1 Drawing Sheet

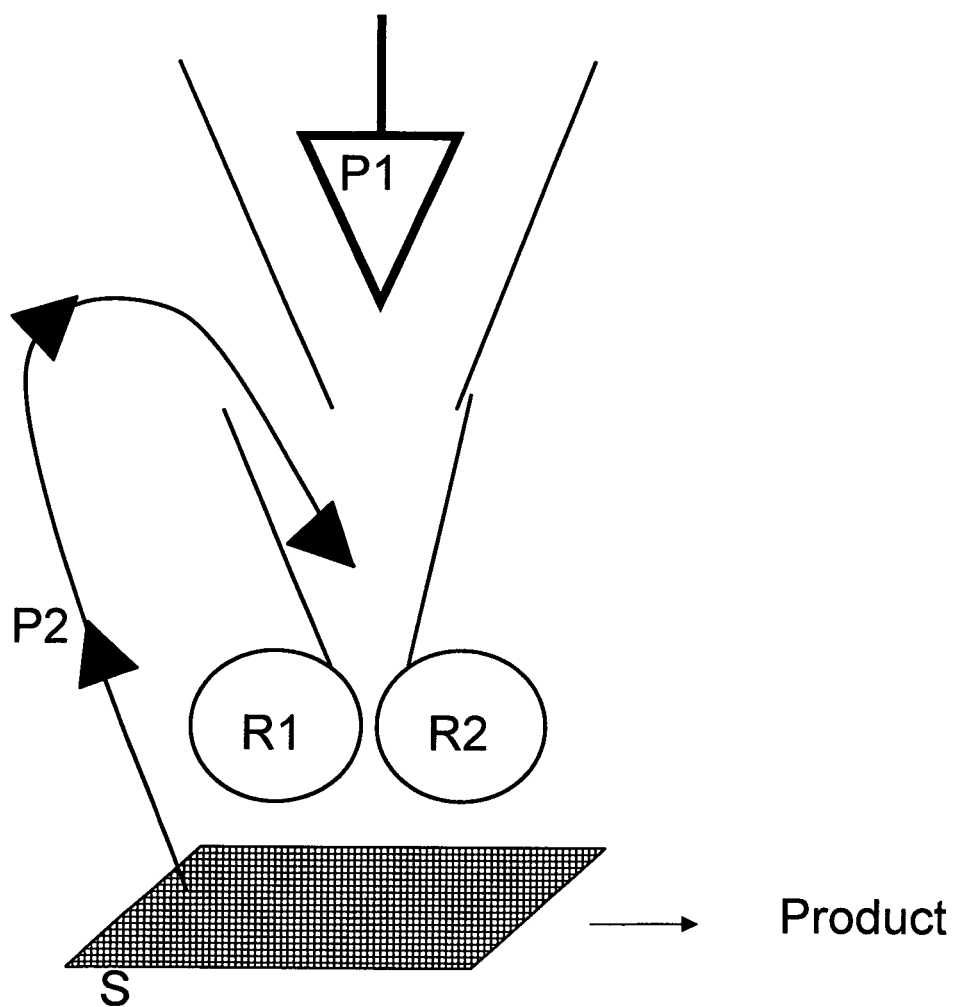

BETA-QUARTZ GLASS CERAMICS AND RELATED PRECURSOR GLASSES

CROSS-REFERENCE TO RELATED APPLICATIONS

This application claims the benefit of French Application No. 1050413, filed on Jan. 22, 2010, the entire contents of which are incorporated herein by reference.

The present disclosure relates to the field of glass-ceramics containing a solid solution of β-quartz (noted as β-quartz herein) as a main crystalline phase and which are suitable for use at high temperatures. These glass-ceramics are most often transparent and colored.

Embodiments of the disclosure relate to novel β-quartz glass-ceramics, the composition of which is most particularly optimized, with reference to the refining included in the method for obtaining them (a refining applied at a standard refining temperature on a glass melt which does not contain any standard refining agent (neither $As_2O_3$, nor $Sb_2O_3$)), with reference to the good resistance to devitrification of their precursor glasses and with reference to their resistance to temperature-ageing; articles containing said novel glass-ceramics; lithium alumino-silicate glasses as precursors of such novel glass-ceramics; as well as methods for preparing said novel glass-ceramics and said articles.

The β-quartz glass-ceramics which contain a solid solution of β-quartz as a main crystalline phase, are known materials, obtained by heat treatment of glasses. The making of articles in a β-quartz glass-ceramic conventionally comprises three main successive steps.

A first step involves melting and refining a batch mixture of mineral raw materials ((preexisting) mineral glass(es) or a mixture of mineral raw materials, precursor of such a glass(es) (said glass(es) being then generated and melted in situ)), generally applied between 1,550 and 1,750° C. (refining is actually suitable for removing as efficiently as possible the gas inclusions from the obtained glass melt).

A second step involves cooling (during which every devitrification is appropriately avoided) and for shaping said obtained glass melt.

A third crystallization or ceramming step involves treating the shaped cooled glass, by a suitable heat treatment (including the successive phases for nucleation and growth of crystals).

The β-quartz glass-ceramics are used in different contexts and notably as a substrate for cooking stoves and for fire-resistant doors and windows, i.e., notably in contexts where they are brought to high temperatures. These glass-ceramics, used for such applications are characterized by a low thermal expansion coefficient (of the order of $\pm 3 \times 10^{-7}$ $K^{-1}$ between 25 and 700° C.).

The microstructure of β-quartz glass-ceramics mainly consists of β-quartz crystallites embedded in a residual glassy phase. Other crystalline phases (other than β-quartz) may also be present in small amount(s) (less than 20% by weight of the crystallized fraction), such as crystalline phases containing nucleation agents such as $TiZrO_4$, or β-spodumene.

In order that said β-quartz glass-ceramics be transparent, it is known that the size of the crystallites should be less than about 70 nm.

In order that said β-quartz glass-ceramics are resistant to deformation, when they are brought to a high temperature, it is known that their total crystal content should advantageously be comprised between 70 and 95% by weight.

The microstructure of the β-quartz glass-ceramics—crystallites of β-quartz in a glassy phase—may moreover change during temperature ageing of said glass-ceramics. Thus, in embodiments, the β-quartz solid solution is metastable and is transformed into a solid solution of β-spodumene at high temperature (between 750 and 1,100° C.). Such a transformation can be detrimental to the transparency of the glass-ceramic and to the thermal expansion coefficient of the latter. Thus, said thermal expansion coefficient may change from 0-3 to 5-15×$10^{-7}$ $K^{-1}$. The transformation (β-quartz→β-spodumene) is likely to occur during ceramization heat treatment or when the glass-ceramic undergoes subsequent heat treatments. Thus, said transformation is likely to occur during the use of the glass-ceramic, in contexts where said glass-ceramic is brought to a high temperature. The transformation temperature (β-quartz→β-spodumene) depends on the composition of the precursor glass (it is lower if the glass contains lower silica content and higher content of alkaline and earth alkaline oxides) and on the heat treatments (for ceramming of said glass or subsequent heat treatments of the glass-ceramic). Thus, the transformation temperature is lower if the heating rate is slower.

The glassy phase itself is also capable of changing. It may crystallize. Thus, other crystalline phases such as rutile ($TiO_2$) and celsian ($BaAl_2Si_2O_8$), may appear in the microstructure of β-quartz glass-ceramics, undergoing heat treatments at high temperature. In large amounts, such other crystalline phases can also be detrimental to the transparency and/or to the thermal expansion. With reference to the thermal expansion, celsian has a high thermal expansion coefficient (close to 40×$10^{-7}$ $K^{-1}$).

The technical problem of temperature stability of the microstructure of β-quartz glass-ceramics, notably transparent glass-ceramics, thus is a real technical problem.

Moreover, within the scope for obtaining β-quartz glass-ceramics and articles in such β-quartz glass-ceramics, gas inclusions are opportunely removed from the precursor glass melt. For this purpose, at least one refining agent is caused to intervene within it in a way known per se. To this day, $As_2O_3$ and/or $Sb_2O_3$ have especially been used as a refining agent. Due to the toxicity of these compounds and to the more and more severe regulations in force, alternative refining agents have been proposed. $SnO_2$ was most particularly retained. However, this compound is less efficient than conventional refining agents, $As_2O_3$ and/or $Sb_2O_3$. To obviate this problem, it has been proposed:

to associate $SnO_2$ with an auxiliary refining agent such as $CeO_2$, $MnO_2$ (see the teaching of patent application EP 1 957 421_, F (see the teaching of patent application EP 1 899 276), Br (see the teaching of patent application EP 1 901 999). Such auxiliary refining agents are responsible for unwanted coloration and/or are expensive and/or are toxic;

to carry out the melting and/or refining temperatures than those used with $As_2O_3$ and/or $Sb_2O_3$. This is not interesting, more particularly from an economical point of view. In this context, it appeared suitable to the inventors to propose precursor compositions (glasses) precursor of β-quartz glass-ceramics, notably transparent β-quartz glass-ceramics, free of arsenic and antimony, but which may however be melted and refined with $SnO_2$ as a refining agent, under the same industrial conditions, notably of temperature (below 1,700° C., advantageously below 1,680° C.), as the compositions of the prior art containing $As_2O_3$ and/or $Sb_2O_3$, where these precursor compositions lead to quality glass-ceramics. This is particularly of interest from an economical point of view. In connection with that, the inventors have experimentally shown that in order that a glass may be melted, under industrial conditions, at a temperature of less than 1,700° C., indeed less than 1,680° C., it should have a viscosity of 300 dPa·s (P) at a temperature below 1,650° C., indeed below 1,640° C.

Precursor glasses of β-quartz glass-ceramics used as cooktops or fire-resistant window panes are often formed by rolling. In order to avoid devitrification during this type of forming, it is advantageous to have glasses for which the liquidus viscosity is greater than about 5,000 dPa·s. The nature of the crystalline phases that are formed in the liquidus depend on the composition of the glass. This may, for example, be zircon or mullite. Devitrification in mullite is very disadvantageous because this phase has a very rapid growth rate.

The inventors, in view of the foregoing, disclose β-quartz glass-ceramics, notably β-quartz transparent glass-ceramics:
1) optimized with respect to their resistance to temperature ageing (first stipulation of the requirements). The disclosed glass-ceramics have proved to be capable of supporting ageing heat treatment of 100 h at 830° C., without forming an appreciable amount (advantageously, less than 20% by weight of the total crystalline phase) of crystals other than β-quartz crystals (notably of β-spodumene and of celsian) (obviously, a material which resists for 100 h at 830° C. resists longer at a lower temperature. The inventors have for example observed that this treatment (of 100 h at 830° C.) is at least as demanding as a heat treatment of 1,000 h at 775° C.); and
2) obtainable from molten glass, which contains neither arsenic, nor antimony, and which has a viscosity of 300 dPa·s (P) at a temperature below 1650° C., advantageously below 1640° C. (first portion of the second stipulation of the requriements); said glass having a viscosity in the liquidus above 5,000 dPa·s (P) (second protion of the second stipulation of the requirements).

One skilled in the art has now already understood that the disclosed β-quartz glass-ceramic are not obvious insofar that said two above stipulations are antagonistic. Indeed, it is very difficult to obtain a β-quartz glass-ceramic resistant to the transformation, notably into β-spodumene, from an easily meltable precursor glass below 1,700° C. The family of glasses suitable for obtaining such a glass-ceramic (of β-quartz, resistant to transformation, notably into β-spodumene) (glasses which contain a high silica content and a low alkaline and earth alkaline content) are difficult to refine because of their high viscosity, notably at temperatures below 1,700° C., a high viscosity which makes the evacuation of the gas inclusions slow. In order to facilitate melting and therefore the refining of such glasses, it would be appropriate to increase their alkaline and earth alkaline content. Now, this inexorably facilitates the occurrence of crystalline phases other than β-quartz.

Patent application EP-A-1 313 675 describes β-quartz transparent glass-ceramics, darkened by reduction of $V_2O_5$, without arsenic or antimony in their composition. It describes such glass-ceramics characterized by a high resistance to devitrification (of their precursor glass). It also describes the obtaining of said β-quartz glass-ceramics.

The teaching of said application EP-A-1 313 675 confirms the antagonistic character of both stipulations of the requirements above. The alkaline $Na_2O$ and $K_2O$, and the earth alkaline CaO, SrO and BaO, improve melting of the glass. By reducing the content of said alkaline and earth alkaline oxides, it is possible to obtain glass-ceramics which are more resistant to temperature ageing.

Said application EP-A-1 313 675 also describes the use of $SnO_2$ as a refining agent and reducing agent of $V_2O_5$. The refining is applied in the examples at 1,640° C. or at 1,975° C. It is most particularly illustrated a performing "mixed" refining involving both chemical (with $SnO_2$) and physical (applied at a temperature of 1,975° C. for one hour).

According to one embodiment, the present disclosure relates to glass-ceramics containing a solid solution of β-quartz as a main crystalline phase (said solid solution of β-quartz representing more than 80% by weight of the total crystalline phase (of the crystallized fraction)), the composition of which favorably meets both antagonistic stipulations of the requirements stated above. Said composition, free of arsenic oxide and antimony oxide, except for inevitable traces, expressed in percentages by weight of oxides, contains, for at least 98% of its weight:

$SiO_2$ 66-70
$Al_2O_3$ 18-<20
$Li_2O$ 3-4
MgO 0.5-1.5
ZnO 1-2.2
$TiO_2$ 2.5-3.2
$ZrO_2$ 1.2-1.8
$SnO_2$ 0.2-0.45
BaO 1-3
SrO 0-3
BaO+SrO 1-3
CaO 0-<0.3
$Na_2O$ 0-<0.3
$K_2O$ 0-<0.3
$Na_2O+K_2O+CaO$ 0-<0.6
$P_2O_5$ 0-2
$Fe_2O_3$ 0-0.12
at least one dye 0-2 (i.e at least one dye is optioinally present up to 2 wt. %).

It is indicated that the composition contains, for at least 98% of its weight, the above oxides. This means, that within the glass-ceramics of the disclosure, the sum of the listed (oxide) compounds represents at least 98% by weight. It advantageously represents at least 99% by weight, or even 100% of said weight. The presence of at least another compound, either neutral or developing such and such non-detrimental action significantly (with reference to the sought properties) cannot be however totally excluded. In any case, said at least one compound If it is present, is present in a small amount: <2% by weight, advantageously <1% by weight. In one embodiment, the composition of the glass-ceramics of the disclosure essentially consists of the listed oxides.

It is indicated that the composition is free of arsenic oxide and antimony oxide, except for inevitable traces. This obviously means that within the composition $As_2O_3$ and/or $Sb_2O_3$ can only be present in an amount which produces no significant effect. Such an amount is generally lower than 250 ppm. The man skilled in the art understands that present $As_2O_3$ and $Sb_2O_3$ are able to have been brought, for example, by using cullet. The above statement concerning the expression "free of arsenic oxide and antimony oxide, except for inevitable traces" applies all along the present text, including when it is used in reference to the LAS precursor glasses.

The disclosed glass-ceramics are β-quartz glass-ceramics, advantageously transparent, suitable for use at high temperatures. Their microstructure is of the type recalled above (crystallites of small sizes (generally between 30 and 70 nm, with reference to the transparence), a high total crystal content (advantageously between 70 and 95%) and a crystalline phase in large majority consisting of β-quartz). Their composition, as stated above and as commented hereafter, is optimized with reference to the requirements specified above.

The involved glass-ceramics are of the LAS type. They contain $LiO_2$, $Al_2O_3$ and $SiO_2$ as essential constituents of the solid solution of β-quartz. With reference to their composition, associating narrow ranges, the following may be specified.

$SiO_2$: the $SiO_2$ content is of at least 66% for obtaining a stable β-quartz structure; it is not greater than 70%, with reference to the melting of the precursor glass.

$Al_2O_3$: the alumina content should be greater than or equal to 18% in order to ensure formation of a sufficient amount of β-quartz crystals. It should be less than 20%. The inventors have shown that this limits the formation of celsian ($BaAl_2Si_2O_8$) during temperature ageing. This also avoids the formation of mullite by devitrification during the cooling of the glass. The alumina content is advantageously comprised between 18 and 19.7%.

$Li_2O$, MgO and ZnO: these elements enter the crystalline phase. If they are involved in too small amounts, the molten glass is too viscous (and difficult to refine) and the amount of β-quartz crystals is too small. If they are involved in excessive amounts, the transformation of β-quartz into β-spodumene is premature. It is important to have a minimum MgO content in order to facilitate melting: this element allows to reduce the high temperature viscosity and facilitate dissolution of $ZrO_2$.

$TiO_2$, $ZrO_2$ and $SnO_2$: these compounds are involved as nucleation agents. They are involved in sufficient amounts for obtaining a large number of β-quartz crystals of small sizes. An excessive amount of $TiO_2$ (>3.2%) is not acceptable (whence the presence of $ZrO_2$) insofar that it causes premature transformation into β-spodumene and/or precipitation of rutile. An excessive amount of $ZrO_2$ (>1.8%) or of $SnO_2$ (>0.45%) is not acceptable insofar that it causes devitrification. $SnO_2$ is also involved as a refining agent (see above). This is why a minimum amount of 0.2% thereof is required. Advantageously, $SnO_2$ is not associated with any auxiliary refining agents selected from $CeO_2$, $MnO_2$, F and Br. So, the disclosed compositions are advantageously free of $CeO_2$, $MnO_2$, F and Br, except from inevitable traces.

BaO and SrO: within the disclosed compositions, BaO and/or SrO have proved to be very efficient for reducing the high temperature viscosity and improving melting of the raw material, glass(es) and/or a mixture of oxides (and therefore facilitating refining), without having a significant impact on the lowering of the temperature where the β-quartz crystals are transformed into crystals of β-spodumene. BaO is preferred over SrO because of the price of the latter. Weight compositions of the glass-ceramics advantageously contain from 1.2 to 3% of BaO and from 0 to 1.8% of SrO (with always from 1 to 3% of BaO+SrO). Weight compositions of the glass-ceramics very advantageously contain no SrO. These oxides (BaO and SrO) remain in the residual glass. This is why their content should not exceed 3%; beyond this, the amount of formed β-quartz is too small and celsian may form during the temperature ageings.

$Na_2O$, $K_2O$ and CaO: these oxides do not enter the β-quartz crystals. They remain in the residual glassy phase. The inventors have shown that their contents (CaO: 0-<0.3, advantageously 0-<0.1; $Na_2O$: 0-<0.3; $K_2O$: 0-<0.3, advantageously 0-<0.2) should remain small:

$$Na_2O+K_2O+CaO<0.6$$

insofar that they promote rapid transformation of the crystals (from β-quartz into β-spodumene). Furthermore, $Na_2O$ and $K_2O$ have proved to be less efficient than MgO, BaO and SrO for improving melting and lowering the high temperature viscosity.

In fact, it is greatly the merit of the inventors of having shown, that with reference to the requirements stated above, the action of MgO, BaO and SrO is much more advantageous than that of $Na_2O$, $K_2O$ and CaO: these elements (MgO, BaO and SrO) are more efficient on lowering the viscosity while causing less transformation of the crystals.

$P_2O_5$: this oxide has the advantage of reducing the high temperature viscosity. However it is expensive.

$Fe_2O_3$: the iron content should remain in the indicated range so that the possibly present iron (a priori always present in the state of an impurity) does not perturb the coloration of the glass-ceramic.

The glass-ceramics, for which the composition was specified above, advantageously have a microstructure with β-quartz crystallites with a size of less than or equal to 60 nm, advantageously less than or equal to 55 nm, a total crystal content between 70 and 95%, and more than 85%, advantageously at least 90%, by weight of the total crystal content consisting of β-quartz crystallites.

Such glass-ceramics are particularly performing in terms of transparency and resistance to temperature ageing. They have the weight composition developed above and are obtained at the end of a conventional ceramming treatment.

The glass-ceramics are not necessarily colored. For use in certain contexts, notably as cooking stovetops, they are generally colored. They then contain an efficient amount of at least one dye. $V_2O_5$ is very often used as a dye. The Applicant has been marketing for many years, cooking stoves of a dark color, notably under the commercial name of Kerablack®, which contain this dye. The Applicant has developed more recently other cooking stoves of dark color, which have a non-zero capability of transmitting wavelengths of visible light comprised between 450 and 480 nm (limits included), corresponding to blue light. Such cooking stoves are suitable for use with displays emitting in the blue range. They have been described in commonly-assigned patent application FR 2 946 041.

With reference to such stovetops, and more generally to the technical problem of transmission of the blue color, the glass-ceramics disclosed herein contain as a dye, according to one embodiment, from 0.01 to 0.2, advantageously from 0.01 to 0.05% by weight of $V_2O_5$, and from 0.01 to 0.1, advantageously from 0.01 to 0.03% by weight of CoO.

Within the scope of this alternative, said glass-ceramics very advantageously or in any case not much nickel oxide (NiO≤0.02% by weight), this with reference to the sought effect of transmission of blue with low integrated transmission (Y) (for the dark color).

According to a second embodiment, the present disclosure relates to articles comprising the disclosed glass-ceramics. Said articles advantageously entirely consist of such a glass-ceramic.

Of course, it is conceivable that the glass-ceramics are suitably used as articles which upon use are subject to high temperatures. Their composition has been optimized for this purpose (see the first stipulation of the requirements explained above).

Thus, the glass-ceramic articles notably consist in cooking stoves, cooking utensils, in micro-wave oven soles, chimney window panes, fire-resistant doors or windows, or pyrolysis- or catalysis-oven windows.

According to a third embodiment, the present disclosure relates to lithium alumino-silicate glasses, precursors of the disclosed glass-ceramics, as described above. Said glasses have the weight composition of said glass-ceramics, as explained above.

According to further embodiments, the present disclosure relates to a method for preparing a glass-ceramic as described above, and to a method for preparing an article at least partly consisting of a glass-ceramic as described above.

Said methods are methods by analogy.

Conventionally, said method for preparing a glass-ceramic comprises the melting and refining of a batch mixture of mineral raw materials (of lithium alumino-silicate glass(es) and/or of a mixture of mineral raw materials, precursor of such a glass(es)), said mixture containing a refining agent, and a ceramization heat treatment.

Said method for preparing an article successively comprises the melting and the refining of a batch mixture of mineral raw materials (of lithium alumino-silicate glass(es) and/or of a mixture of mineral raw materials, precursor of such a glass(es)), said mixture containing a refining agent, the cooling of the obtained refined molten glass and simultaneously its shaping into the sought shape for the targeted article, and a ceramming heat treatment of said shaped glass.

In a characteristic way, said methods are applied starting with a batch mixture of mineral raw materials (with glass(es) and/or a mixture of mineral raw materials) which has a weight composition corresponding to that of a disclosed glass-ceramic (weight composition with narrow ranges, shown and explained above). Said composition contains except for inevitable traces, neither any arsenic oxide, nor any antimony oxide. As a refining agent, it contains tin oxide (advantageously, it contains no auxiliary refining agent selected from the group consisting in $CeO_2$, $MnO_2$, F and Br). Incidentally, it is recalled here that said composition is most particularly characterized by its absolute and relative contents of $Al_2O_3$, $Li_2O$, MgO and ZnO; BaO and/or SrO; $Na_2O$, $K_2O$ and CaO.

In a characteristic way, said methods include a melting and refining step which, applied at a temperature of less than 1,700° C. (indeed less than 1680° C.), gives very satisfactory results. In this, the first portion of the second stipulation of the requirements explained above is met. Thus, the melting and refining of the precursor compositions of the glass-ceramics are advantageously applied at a temperature of less than 1,700° C. indeed less than 1680° C. (i.e. at a standard temperature for conventional refining with $As_2O_3$ and/or $Sb_2O_3$). Of course, application of the melting and refining step at a higher temperature cannot be totally excluded from the scope of the methods of the disclosure, but this is not required with reference to the sought result and such an application would a priori only complicate the application of the methods and imply additional costs.

The shaping of the refined glass, notably by rolling, is facilitated by the good resistance of said glass to devitrification.

The ceramming treatment conventionally includes two steps: a nucleation step (typically carried out between 650 and 800° C.) and a crystal growth step (typically carried out between 880 and 1,000° C.). Durations of 10 min are at least required for each of said steps. As this is well-known to one skilled in the art, these durations and temperatures may be adapted depending on the composition of the initial glass and on the temperature rise rates. The ceramming treatment may thereby advantageously be applied so that the material has a total crystal content between 70 and 95% and is essentially crystallized into β-quartz (that this phase represents more than 85%, advantageously at least 90%, by weight of the crystallized material) and that the β-quartz crystallites have an average size of less than or equal to 60 nm, advantageously less than or equal to 55 nm. The inventors have shown that it is when these conditions are met, that best transparency (the lowest diffusion) is obtained and that the material is more stable during subsequent heat treatments.

EXAMPLES

For producing batches of 1 kg of precursor glass, the raw materials, in proportions (weight proportions expressed as oxides) copied out in the first portion of the Table 1 hereafter, having been mixed carefully.

The mixtures have been placed, for melting (and refining) in platinum crucibles. The filled crucibles were introduced into an oven pre-heated to 1,500° C.

They underwent therein the melting cycle hereafter: a rise in temperature from 1,500° C. to 1,650° C. within 2 h, and maintaining 1,650° C. for 5 h 30 min.

The crucibles were then taken out of the oven and the melted glass was poured on a heated steel plate. It was rolled thereon to a thickness of 6 mm and annealed for 1 h at 650° C.

The high temperature viscosity was measured on the glass. The temperature at which the viscosity is 300 dPa·s (T(300 dPa·s)) is indicated in the second portion of Table 1.

The devitrification characteristics were determined in the following way. Glass samples (0.5 cm$^3$) were subjected to the following heat treatment: introduction into a preheated oven at 1430° C., maintaining this temperature for 30 min, cooling down to the test temperature T, at a rate of 10° C./min, maintaining this temperature for 17 h, and quenching the samples.

The crystals are observed by optical microscopy. In the second portion of the Table 1 hereafter, the liquidus is given by a range of temperatures (and associated viscosities): the highest temperature corresponds to the minimum temperature at which no crystal is observed, the lowest temperature to the maximum temperature at which crystals are observed. The nature of the crystals which form at this temperature is also indicated.

Rolled glass plates are then subjected to the ceramming treatment hereafter: introduction of said plates into the oven preheated to 500° C., temperature rise of the oven from 500° C. to 820° C., within 30 min, temperature rise, from 820° C. to the maximum temperature for crystal growth, T(max), within 10 min, maintaining T(max) for 12 min, and cooling at the cooling rate of the oven.

The inventors were interested in the "stability" of the microstructure of the obtained β-quartz glass-ceramics, by subjecting the samples to differential calorimetric analysis (DSC). The samples were tested with a heating rate of 10° C./min (from room temperature to 1,200° C.). The appearance of new crystalline phases is expressed by the occurrence of exothermic peaks. The temperature of occurrence of the first exothermic peak, T(DSC), is indicated in the second portion of the Table 1 hereafter. The stability was also measured after an ageing of 100 h at 830° C. in a static oven. The microstructure of the samples was analyzed before and after said ageing by X-ray diffraction. For X-ray diffraction analyses, a diffractometer working with monochromatic radiation, with a Cu cathode and having a rapid multi-channel linear detector (RTMS) was used. With the analysis of the X-ray diffraction diagrams by a Rietveld refinement method, it was possible to obtain the nature and percentage of the crystalline phases in presence as well as the average sizes of the β-quartz solid solution crystallites. The (weight) percentage of each crystalline phase is given relatively to the total crystallized fraction.

The obtained results have been indicated in the second portion of the Table 1 hereafter (XRD: % of β-quartz crystals, (size of said β-quartz crystals), % of β-spodumene).

It was shown that in order that a glass may be melted, under industrial conditions, at a temperature of less than 1,700° C., indeed less than 1680° C., it should have a viscosity of 300 dPa·s (P) at a temperature below 1,650° C., indeed 1640° C.

In order that a glass be easily able to be industrially shaped, its liquidus viscosity should be greater than 5,000 dPa·s. In order that a glass-ceramic undergoes the ageing test (100 h at 830° C.) without a major change in its β-quartz microstructure, the first DSC peak should not appear below 1,030° C.

The thermal expansion coefficient (CTE) and the transmission characteristics of certain glass-ceramics were also measured. The transmission measurements were carried out on polished samples with a thickness of 3 mm by means of a spectrophotometer equipped with an integrating sphere. The haze values are calculated according to the ASTM D1003-07 standard. The total visible integrated transmission and haze values (haze) with the D65 illuminant, are copied out in Table 1 (second portion).

Examples 1-7 are comparative examples. Examples 8-16 illustrate various embodiments.

The compositions of Examples 1 and 2 contain too high $Na_2O$ and $CaO$ contents and accordingly, the temperature of occurrence of new crystalline phases as measured by DSC is too low.

The compositions of Examples 3 and 4 contain a too high MgO content and accordingly, the temperature of occurrence of new crystalline phases as measured by DSC is too low.

The composition of Example 5 does not contain any MgO and accordingly its high temperature viscosity is too high.

The composition of Example 6 contains a too high $Al_2O_3$ content and does not contain any BaO. Its liquidus viscosity is too low, all the more so since the phase which is formed at liquidus is mullite.

The composition of Example 7 contains a too low BaO content. The temperature at which the glass has a viscosity of 300 dPa·s (P) is too high.

TABLE 1

| | Examples | | | |
|---|---|---|---|---|
| | 1 | 2 | 3 | 4 |
| Composition (weight %) | | | | |
| $SiO_2$ | 65.57 | 66.36 | 67.57 | 66.99 |
| $Al_2O_3$ | 20.3 | 18.8 | 19.3 | 19.3 |
| $Li_2O$ | 3.7 | 3.5 | 3.6 | 3.5 |
| MgO | 0.4 | 1.3 | 2.0 | 1.6 |
| ZnO | 1.5 | 1.5 | 1.6 | 1.6 |
| BaO | 2.6 | 2.6 | 0.8 | 2 |
| $Na_2O$ | 0.6 | 0.6 | 0.2 | 0.1 |
| $K_2O$ | 0.2 | 0.2 | 0.1 | 0.1 |
| CaO | 0.5 | 0.5 | | |
| $TiO_2$ | 2.9 | 2.9 | 3.0 | 2.8 |
| $ZrO_2$ | 1.3 | 1.3 | 1.4 | 1.6 |
| $SnO_2$ | 0.3 | 0.3 | 0.3 | 0.3 |
| $P_2O_5$ | | | | |
| $V_2O_5$ | 0.029 | 0.029 | 0.028 | 0.021 |
| CoO | 0.019 | 0.015 | 0.015 | 0.015 |
| $Fe_2O_3$ | 0.082 | 0.096 | 0.087 | 0.074 |
| Total | 100.00 | 100.00 | 100.00 | 100.00 |
| $Na_2O + K_2O + CaO$ | 1.3 | 1.3 | 0.3 | 0.3 |
| T(300 dPa.s) | 1618° C. | | | |
| Liquidus: | | | | |
| temperature (° C.) | | 1270-1300 | | |
| viscosity (dPa.s) | | | | |
| crystalline phase | | zirconia | | |
| T(max) | 920° C. | 920° C. | 970° C. | 960° C. |
| T(DSC) | 1021° C. | 992° C. | 998° C. | 1020° C. |
| $CTE_{25-700° C.}$ $(10^{-7} K^{-1})$ | | 13.70 | | |
| XRD: | | | | |
| % β-quartz | 90.0% | 33.5% | | 66.3% |
| (size of the crystals) | (44 nm) | (71 nm) | | (75 nm) |
| % β-spodumene | 4% | 61.2% | | 30.30% |
| Transmission: Y | | | | |
| Haze | | | | |
| After 100 h/830° C. XRD: | | | | |
| % β-quartz | 72.0% | | | |
| (size of the crystals) | (52 nm) | | | |
| % β-spodumene | 21.9% | | | |
| $CTE_{25-700° C.}$ $(10^{-7} K^{-1})$ | | | | |

| | 5 | 6 | 7 | 8 |
|---|---|---|---|---|
| Composition (weight %) | | | | |
| $SiO_2$ | 67.28 | 66.17 | 69.1 | 67.08 |
| $Al_2O_3$ | 20.4 | 22.5 | 19.0 | 19.3 |
| $Li_2O$ | 3.5 | 3.5 | 3.5 | 3.6 |
| MgO | | 1.1 | 1.2 | 1.1 |
| ZnO | 2.1 | 1.6 | 1.6 | 2.1 |
| BaO | 1.4 | | 0.8 | 1.7 |
| $Na_2O$ | 0.6 | 0.2 | 0.1 | 0.2 |
| $K_2O$ | 0.1 | 0.2 | 0.0 | 0.1 |
| CaO | | | | |
| $TiO_2$ | 2.6 | 2.7 | 2.6 | 3.0 |
| $ZrO_2$ | 1.7 | 1.7 | 1.7 | 1.4 |
| $SnO_2$ | 0.3 | 0.2 | 0.3 | 0.3 |
| $P_2O_5$ | | | | |
| $V_2O_5$ | | 0.094 | 0.04 | 0.023 |
| CoO | | | | 0.015 |
| $Fe_2O_3$ | 0.02 | 0.036 | 0.06 | 0.082 |
| Total | 100.00 | 100.00 | 100.00 | 100.00 |
| $Na_2O + K_2O + CaO$ | 0.7 | 0.4 | 0.1 | 0.3 |
| T(300 dPa.s) | 1670° C. | | 1650° C. | |
| Liquidus: | | | | |
| temperature (° C.) | | 1361-1405 | 1343-1356 | |
| viscosity (dPa.s) | | 3000-5400 | 7500-9000 | |
| crystalline phase | | mullite | zirconia | |
| T(max) | 920° C. | 920° C. | 970° C. | 970° C. |
| T(DSC) | | | 1090° C. | 1047° C. |
| $CTE_{25-700° C.}$ $(10^{-7} K^{-1})$ | −5.47 | | | −1.15 |
| XRD: | | | | |
| % β-quartz | 93.9% | | 96.4% | 93.7% |
| (size of the crystals) | (27 nm) | | (43 nm) | (62 nm) |
| % β-spodumene | 0% | | 0% | 1.1% |
| Transmission: Y | | | | |
| Haze | | | | |
| After 100 h/830° C. XRD: | | | | |
| % β-quartz | | | | |
| (size of the crystals) | | | | |
| % β-spodumene | | | | |
| $CTE_{25-700° C.}$ $(10^{-7} K^{-1})$ | | | | |

| | 9 | 10 | 11 | 12 |
|---|---|---|---|---|
| Composition (weight %) | | | | |
| $SiO_2$ | 67.97 | 67.36 | 67.36 | 67.27 |
| $Al_2O_3$ | 18.9 | 18.9 | 19.2 | 18.9 |
| $Li_2O$ | 3.5 | 3.5 | 3.5 | 3.5 |
| MgO | 1.1 | 1.2 | 1.3 | 1.3 |
| ZnO | 1.6 | 1.5 | 1.7 | 1.5 |
| BaO | 2.0 | 2.6 | 1.8 | 2.6 |
| $Na_2O$ | 0.1 | 0.2 | 0.2 | 0.2 |
| $K_2O$ | 0.1 | 0.1 | 0.1 | 0.1 |

TABLE 1-continued

| | Examples | | | |
|---|---|---|---|---|
| CaO | | | | |
| $TiO_2$ | 2.7 | 2.9 | 3.0 | 2.7 |
| $ZrO_2$ | 1.6 | 1.3 | 1.4 | 1.5 |
| $SnO_2$ | 0.3 | 0.3 | 0.3 | 0.3 |
| $P_2O_5$ | | | | |
| $V_2O_5$ | 0.025 | 0.028 | 0.027 | 0.026 |
| CoO | 0.016 | 0.015 | 0.015 | 0.015 |
| $Fe_2O_3$ | 0.089 | 0.097 | 0.098 | 0.089 |
| Total | 100.00 | 100.00 | 100.00 | 100.00 |
| $Na_2O + K_2O +$ CaO | 0.3 | 0.3 | 0.3 | 0.3 |
| T(300 dPa.s) | 1631° C. | 1621° C. | 1630° C. | 1625° C. |
| Liquidus: | | | | |
| temperature (° C.) | 1329-1349 | | 1290-1311 | |
| viscosity (dPa.s) | 8000-11000 | | 14000-20000 | |
| crystalline phase | zirconia | | zirconia | |
| T(max) | 970° C. | 970° C. | 970° C. | 970° C. |
| T(DSC) | 1071° C. | 1046° C. | 1066° C. | 1052° C. |
| $CTE_{25\text{-}700°\,C.}$ $(10^{-7}\,K^{-1})$ | | | −0.89 | 0.88 |
| XRD: | | | | |
| % β-quartz | 96.5% | 93.1% | 94.9% | 95.0% |
| (size of the crystals) | (51 nm) | (63 nm) | (49 nm) | (50 nm) |
| % β-spodumene | 0% | 1.7% | 0% | 0% |
| Transmission: Y | | | 2.5 | 3.5 |
| Haze | | | 0.24 | 0.4 |
| After 100 h/830° C. | | | | |
| XRD: | | | | |
| % β-quartz | | | 91.9% | 91.4 |
| (size of the crystals) | | | (45 nm) | (51 nm) |
| % β-spodumene | | | 0% | 0% |
| $CTE_{25\text{-}700°\,C.}$ $(10^{-7}\,K^{-1})$ | | | −0.3 | |

| | 13 | 14 | 15 | 16 |
|---|---|---|---|---|
| Composition (weight %) | | | | |
| $SiO_2$ | 67.87 | 67.07 | 66.88 | 67.99 |
| $Al_2O_3$ | 18.9 | 19.0 | 19.3 | 19.3 |
| $Li_2O$ | 3.5 | 3.6 | 3.6 | 3.5 |
| MgO | 1.1 | 1.3 | 1.1 | 0.6 |
| ZnO | 1.6 | 1.5 | 1.6 | 1.6 |
| BaO | 2.0 | 2.5 | 1.5 | 2 |
| $Na_2O$ | 0.1 | 0.2 | 0.1 | 0.1 |
| $K_2O$ | 0.1 | 0.1 | 0.1 | 0.1 |
| CaO | | | | |
| $TiO_2$ | 2.7 | 2.7 | 2.8 | 2.82 |
| $ZrO_2$ | 1.6 | 1.5 | 1.6 | 1.61 |
| $SnO_2$ | 0.4 | 0.4 | 0.3 | 0.3 |
| $P_2O_5$ | | | 1 | |
| $V_2O_5$ | 0.024 | 0.026 | 0.025 | 0.021 |
| CoO | 0.016 | 0.015 | 0.015 | 0.015 |
| $Fe_2O_3$ | 0.085 | 0.090 | 0.080 | 0.074 |
| Total | 100.00 | 100.00 | 100.00 | 100.00 |
| $Na_2O + K_2O +$ CaO | 0.2 | 0.3 | 0.2 | 0.2 |
| T(300 dPa.s) | | | | |
| Liquidus: | | | | |
| temperature (° C.) | | | | |
| viscosity (dPa.s) | | | | |
| crystalline phase | | | | |
| T(max) | 970° C. | 970° C. | 970° C. | 960° C. |
| T(DSC) | 1068° C. | | 1058° C. | |
| $CTE_{25\text{-}700°\,C.}$ $(10^{-7}\,K^{-1})$ | | 0.56 | −1.52 | |
| XRD: | | | | |
| % β-quartz | | 94.6% | 95.3% | 95.9% |
| (size of the crystals) | | (53 nm) | (54 nm) | (33 nm) |
| % β-spodumene | | 0% | 0% | 0% |
| Transmission: Y | | | | |
| Haze | | | | |
| After 100 h/830° C. | | | | |
| XRD: | | | | |
| % β-quartz | 91.5% | 93.8% | | |
| (size of the crystals) | (55 nm) | (48 nm) | | |
| % β-spodumene | 0% | 0% | | |
| $CTE_{25\text{-}700°\,C.}$ $(10^{-7}\,K^{-1})$ | | | | |

The capability of melting and refining of the glasses is also illustrated by the Examples (A and 9') below.

In order to produce batches of 1 kg of precursor glass, the raw materials in the proportions (weight proportions expressed as oxides) copied out in the first portion of Table 2 hereafter, were mixed carefully.

The mixtures were placed, for melting (and refining), in platinum crucibles. The filled crucibles were introduced into an oven pre-heated to 1,500° C. They underwent therein the melting cycle hereafter: a rise in temperature from 1,500° C. to 1,650° C. within 2 h, and maintaining 1,650° C. for 2 hours.

The crucibles were then taken out of the oven and the molten glass was poured on a heated steel plate. It was rolled thereon to a thickness of 6 mm and annealed for 1 h at 650° C. Because of the short maintaining time at 1,650° C., the refining is incomplete. The number of bubbles in the plates was automatically counted with a camera coupled to an image analyzer.

Example A is a comparative example. The indicated composition does not contain any BaO and contains a too high $Al_2O_3$ content. The corresponding glass (poorly refined) has a number of bubbles which is ten times greater than that of Example 9' (the glass 9' has the glass composition of the Example 9 above. It was subjected to a different melting cycle).

TABLE 2

| Examples | A | 9' |
|---|---|---|
| Composition (weight %) | | |
| $SiO_2$ | 67.49 | 67.97 |
| $Al_2O_3$ | 21.3 | 18.9 |
| $Li_2O$ | 3.3 | 3.5 |
| MgO | 1 | 1.1 |
| ZnO | 1.8 | 1.6 |
| BaO | | 2.0 |
| $Na_2O$ | 0.3 | 0.1 |
| $K_2O$ | 0.1 | 0.1 |
| CaO | | |
| $TiO_2$ | 2.5 | 2.7 |
| $ZrO_2$ | 1.8 | 1.6 |
| $SnO_2$ | 0.3 | 0.3 |
| $P_2O_5$ | | |
| $V_2O_5$ | 0.07 | 0.025 |
| CoO | | 0.016 |
| $Fe_2O_3$ | 0.04 | 0.089 |
| Total | 100 | 100.00 |
| Number of bubbles per $cm^3$ | 548 | 52 |

The invention claimed is:

1. A glass-ceramic containing a β-quartz solid solution as a main crystalline phase, wherein its composition, expressed in percentages by weight of oxides, is free of $CeO_2$, $MnO_2$, F, Br, arsenic oxide and antimony oxide except for inevitable traces, and comprises, for at least 98% of its weight:

| | |
|---|---|
| $SiO_2$ | 66-70 |
| $Al_2O_3$ | 18-<20 |
| $Li_2O$ | 3-4 |
| MgO | 0.5-1.5 |
| ZnO | 1-2.2 |
| $TiO_2$ | 2.5-3.2 |
| $ZrO_2$ | 1.2-1.8 |
| $SnO_2$ | 0.2-0.45 |
| BaO | 1-3 |
| SrO | 0-2 |
| BaO + SrO | 1-3 |
| CaO | 0-<0.3 |
| $Na_2O$ | 0-<0.3 |
| $K_2O$ | 0-<0.3 |
| $Na_2O + K_2O + CaO$ | 0-<0.6 |
| $P_2O_5$ | 0-2 |
| $Fe_2O_3$ | 0-0.12 |
| at least one dye | 0-2. |

2. The glass-ceramic according to claim 1, the composition of which contains from 18 to 19.7% $Al_2O_3$.

3. The glass-ceramic according to claim 1, the composition of which contains from 1.2 to 3% BaO and from 0 to 1.8% SrO.

4. The glass-ceramic according to claim 1, the composition of which is free of SrO except for inevitable traces.

5. The glass-ceramic according to claim 1, the composition of which, expressed in percentages by weight of oxides, is:

| | |
|---|---|
| $SiO_2$ | 67.97 |
| $Al_2O$ | 318.9 |
| $Li_2O$ | 3.5 |
| MgO | 1.1 |
| ZnO | 1.6 |
| BaO | 2.0 |
| $Na_2O$ | 0.1 |
| $K_2O$ | 0.1 |
| $TiO_2$ | 2.7 |
| $ZrO_2$ | 1.6 |
| $SnO_2$ | 0.3 |
| $V_2O_5$ | 0.025 |
| CoO | 0.016 |
| $Fe_2O_3$ | 0.089. |

6. The glass-ceramic according to claim 1, comprising β-quartz crystallites having a size of less than or equal 60 nm, a total crystalline content from 70 to 95%, and wherein more than 85% by weight of the total crystalline content consists of the β-quartz crystallites.

7. The glass-ceramic according to claim 1, the composition of which contains vanadium oxide and cobalt oxide as dyes.

8. The glass-ceramic according to claim 7, the composition of which contains:

| | |
|---|---|
| $V_2O_5$ | 0.01 to 0.2, and |
| CoO | 0.01 to 0.1. |

9. An article selected from the group consisting of a cooking stove, a cooking utensil, a micro-wave oven sole, a chimney window, a fire-resistant door or window, and a window of a pyrolysis- or catalysis-oven comprising a glass-ceramic according to claim 1.

10. A method for preparing a glass-ceramic according to claim 1, comprising melting and refining of a batch mixture of mineral raw materials, said mixture containing a refining agent, and a ceramming heat treatment, wherein said mixture has a composition that is free of $CeO_2$, $MnO_2$, F, Br, arsenic oxide and antimony oxide except for inevitable traces, and comprises, for at least 98% of its weight:

| | |
|---|---|
| $SiO_2$ | 66-70 |
| $Al_2O_3$ | 18-<20 |
| $Li_2O$ | 3-4 |
| MgO | 0.5-1.5 |
| ZnO | 1-2.2 |
| $TiO_2$ | 2.5-3.2 |
| $ZrO_2$ | 1.2-1.8 |
| $SnO_2$ | 0.2-0.45 |
| BaO | 1-3 |
| SrO | 0-2 |
| BaO + SrO | 1-3 |
| CaO | 0-<0.3 |
| $Na_2O$ | 0-<0.3 |
| $K_2O$ | 0-<0.3 |
| $Na_2O + K_2O + CaO$ | 0-<0.6 |
| $P_2O_5$ | 0-2 |
| $Fe_2O_3$ | 0-0.12 |
| at least one dye | 0-2; | the melting and refining being carried out at a temperature of less than 1,700° C.

* * * * *